E. RONCERAY.
APPARATUS FOR FORMING SAND MOLDS.
APPLICATION FILED JULY 8, 1911.

1,070,293.

Patented Aug. 12, 1913.
9 SHEETS—SHEET 2.

Witnesses:
Harvey L. Lechner
Julian H. Kendig

Inventor:
Eugene Ronceray
by atty Paul Synnestvedt

E. RONCERAY.
APPARATUS FOR FORMING SAND MOLDS.
APPLICATION FILED JULY 8, 1911.

1,070,293.

Patented Aug. 12, 1913.
9 SHEETS—SHEET 4.

Witnesses:

Inventor:
Eugene Ronceray

E. RONCERAY.
APPARATUS FOR FORMING SAND MOLDS.
APPLICATION FILED JULY 8, 1911.

1,070,293.

Patented Aug. 12, 1913.
9 SHEETS—SHEET 5.

E. RONCERAY.
APPARATUS FOR FORMING SAND MOLDS.
APPLICATION FILED JULY 8, 1911.
1,070,293.
Patented Aug. 12, 1913.
9 SHEETS—SHEET 6.
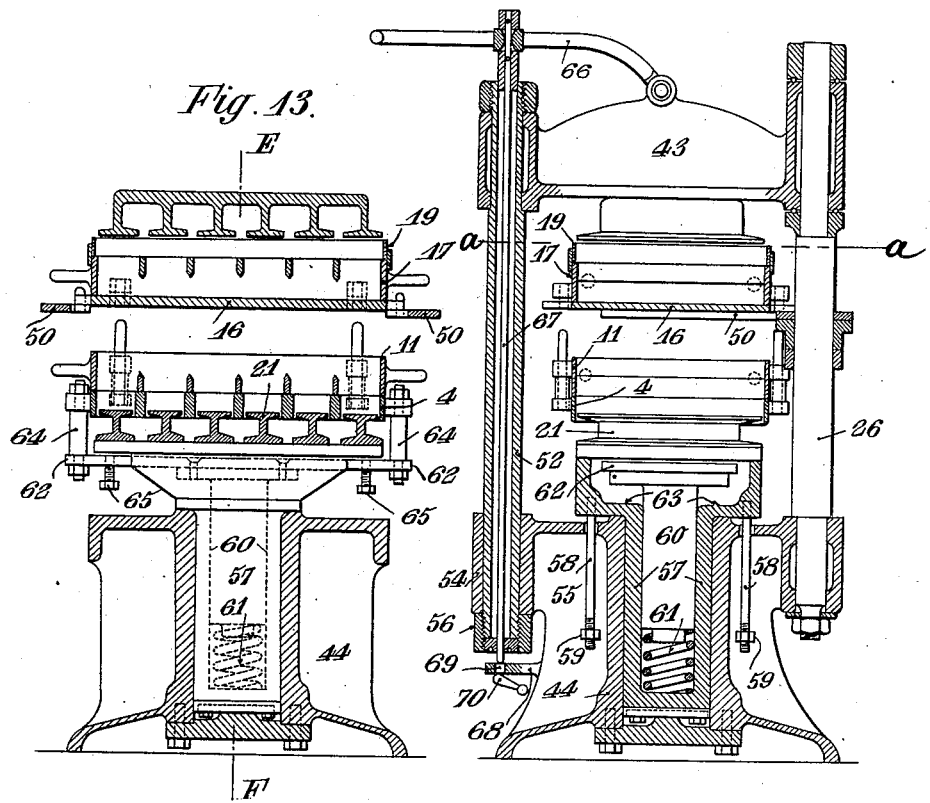
Fig. 14.
Fig. 13.
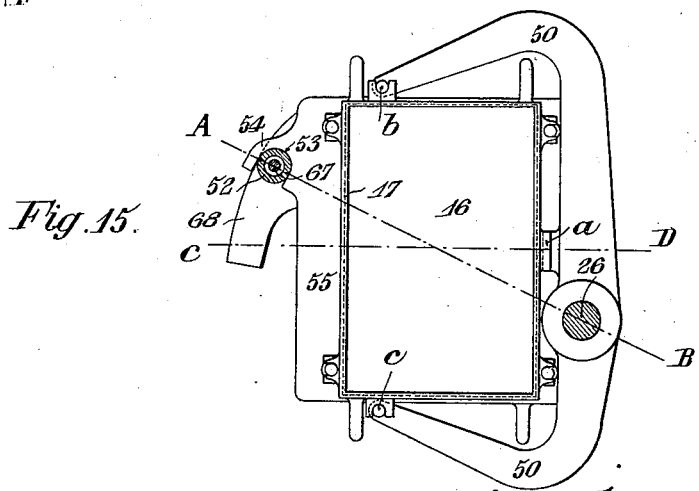
Fig. 15.
Witnesses:
Harvey L. Lechner
Julian H. Kendig
Inventor:
Eugene Ronceray
by atty
Paul Synnestvedt

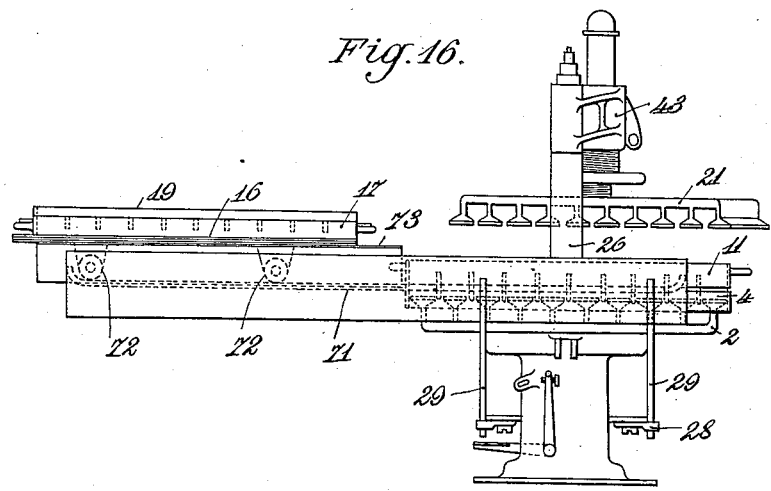
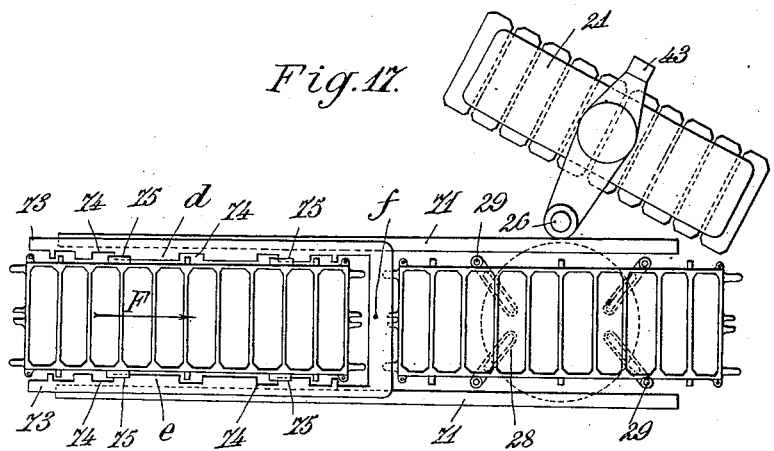

E. RONCERAY.
APPARATUS FOR FORMING SAND MOLDS.
APPLICATION FILED JULY 8, 1911.

1,070,293.

Patented Aug. 12, 1913.

9 SHEETS—SHEET 8.

E. RONCERAY.
APPARATUS FOR FORMING SAND MOLDS.
APPLICATION FILED JULY 8, 1911.

1,070,293.

Patented Aug. 12, 1913.

9 SHEETS—SHEET 9.

Witnesses:
Harry L. Lechner
Julian H. Kendig

Inventor:
Eugene Ronceray
by atty
Paul Synnestvedt

COLUMBIA PLANOGRAPH CO., WASHINGTON, D. C.

UNITED STATES PATENT OFFICE.

EUGENE RONCERAY, OF PARIS, FRANCE, ASSIGNOR TO SOCIETE ANONYME DES ETABLISSEMENTS PH. BONVILLAIN & E. RONCERAY, OF PARIS, FRANCE, A CORPORATION OF FRANCE.

APPARATUS FOR FORMING SAND MOLDS.

1,070,293.  Specification of Letters Patent.  Patented Aug. 12, 1913.

Application filed July 8, 1911.  Serial No. 637,455.

*To all whom it may concern:*

Be it known that I, EUGENE RONCERAY, a citizen of the Republic of France, and a resident of Paris, France, have invented certain new and useful Improvements in Apparatus for Forming Sand Molds, of which the following is a specification.

The invention has reference to the forming of sand molds and particularly to an improved method of and apparatus for forming the halves of sand molds simultaneously. Among the objects of my invention is the provision of an improved apparatus whereby the two flasks forming the sand mold may be simultaneously filled, simultaneously pressed and then assembled on the same machine. In general, my invention is designed to provide an improved apparatus whereby the time consumed in filling the flasks with sand, in ramming and drawing the pattern and in assembling the two flasks is greatly shortened, thereby increasing the capacity of the machine and decreasing the cost of production. These, together with such other objects as may hereinafter appear or are incidental to my invention I attain by means of a construction illustrated in the accompanying drawings as applied to a variety of different types of molding machines.

Figure 1:
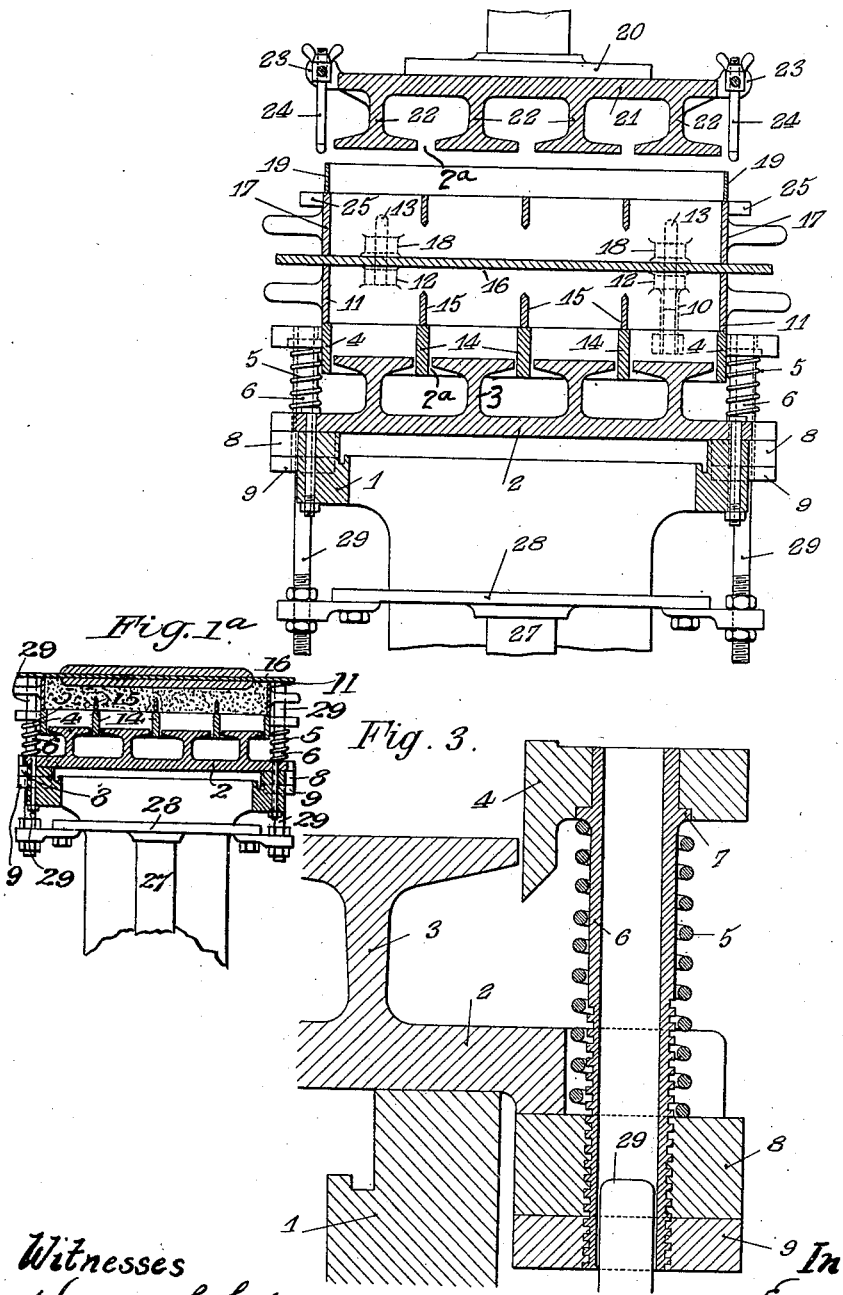
Figure 2:
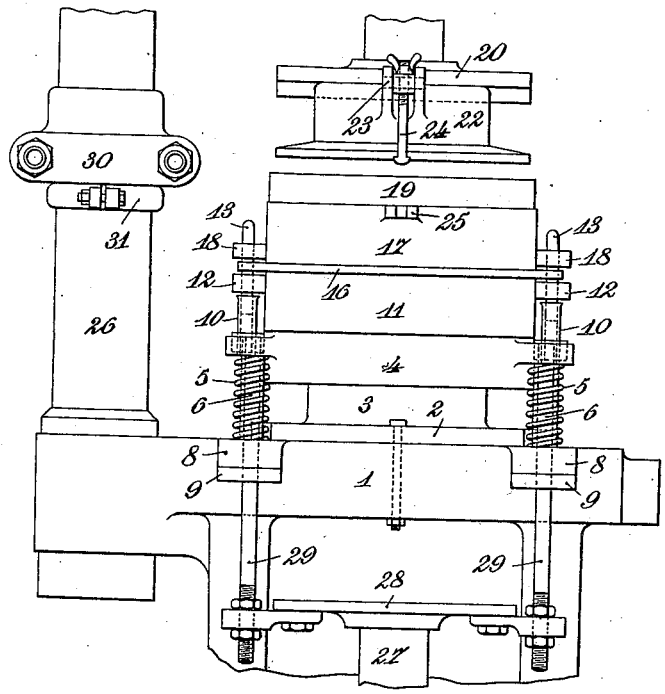
Figure 4:
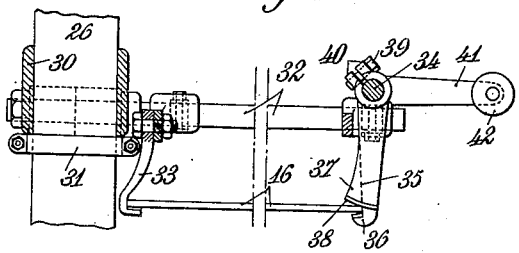
Figure 5:
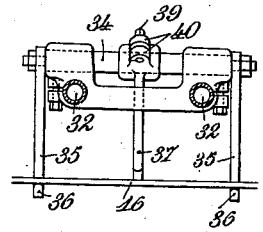
Figure 6:
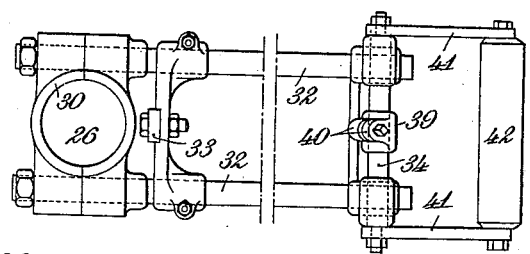
Figure 7:
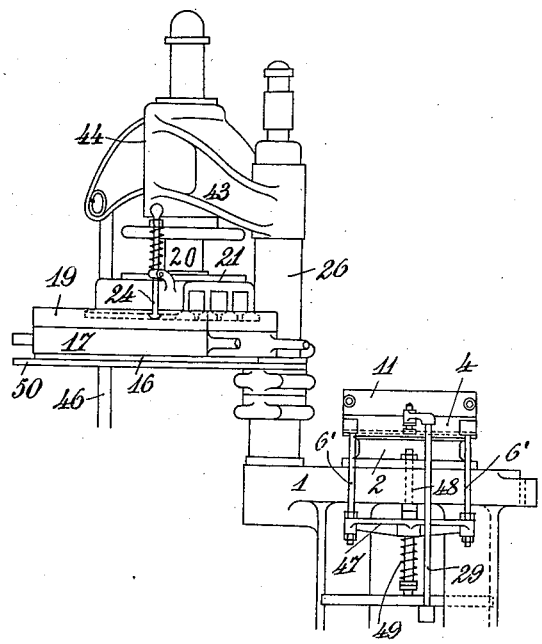
Figure 8:
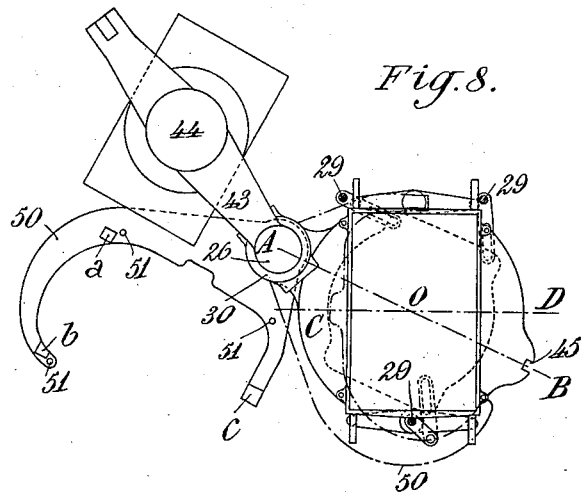
Figure 9:
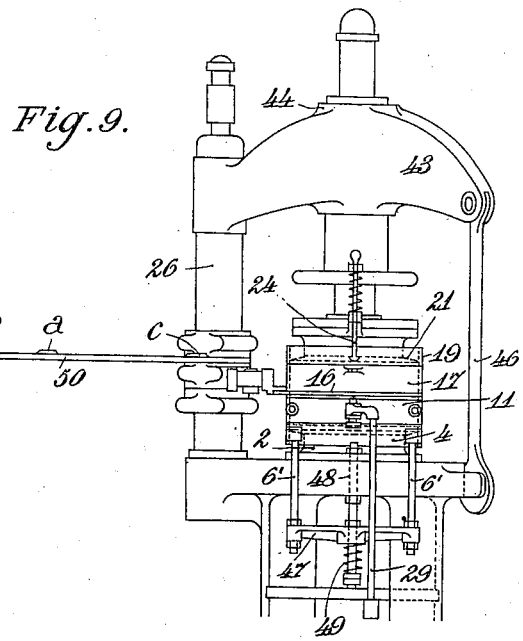
Figure 10:
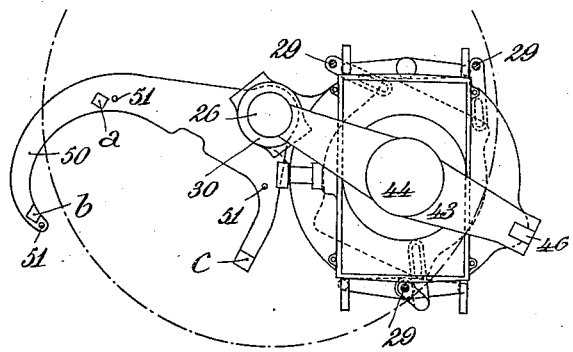
Figure 11:
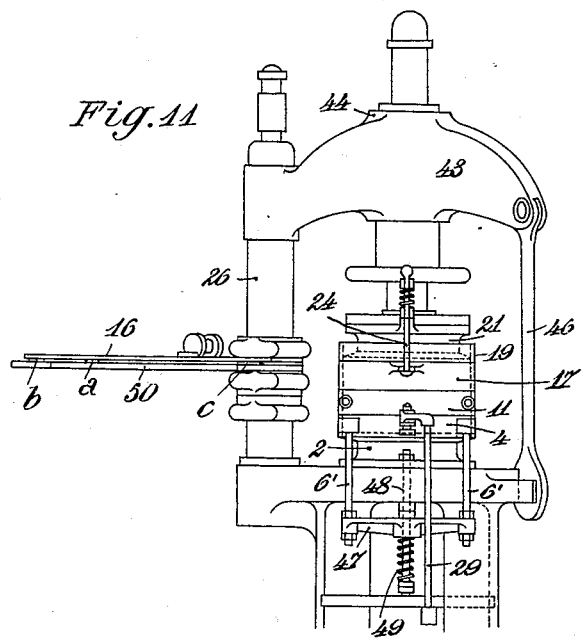
Figure 12:
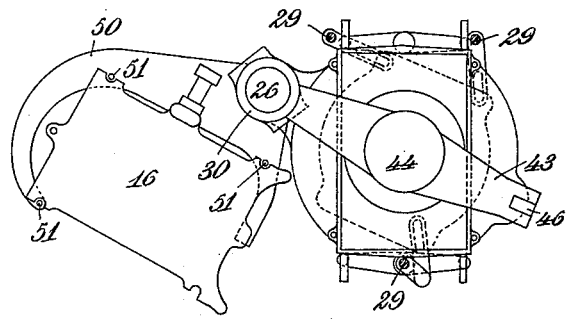
Figure 18:
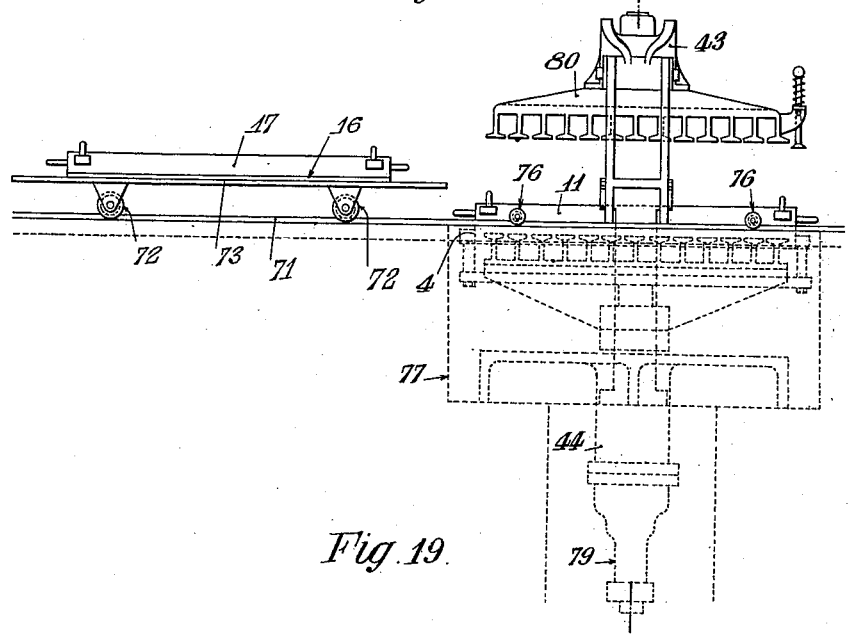
Figure 19:
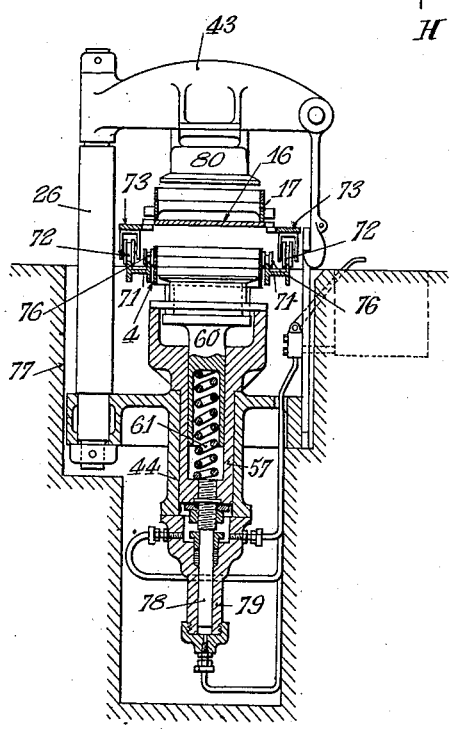
Figure 20:
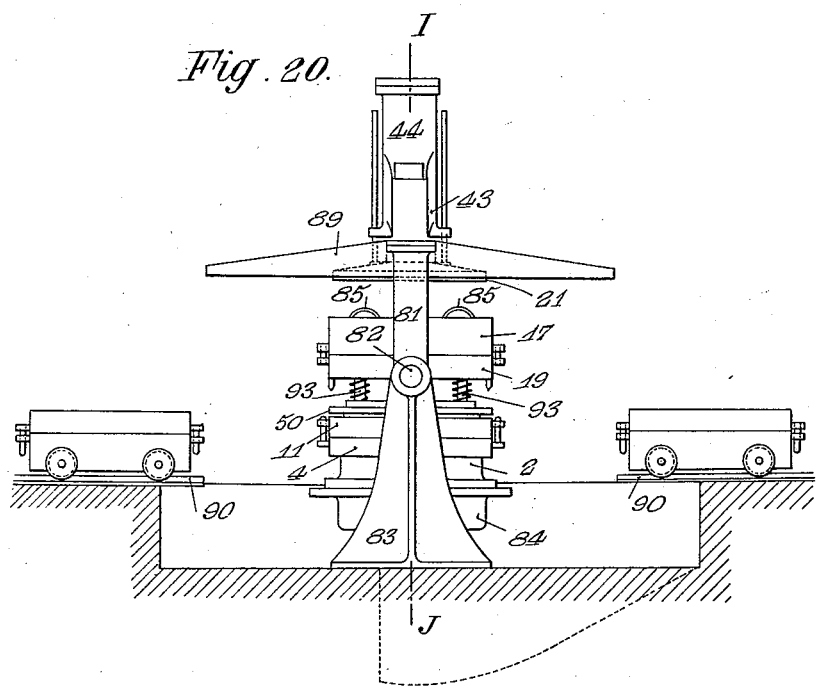
Figure 21:
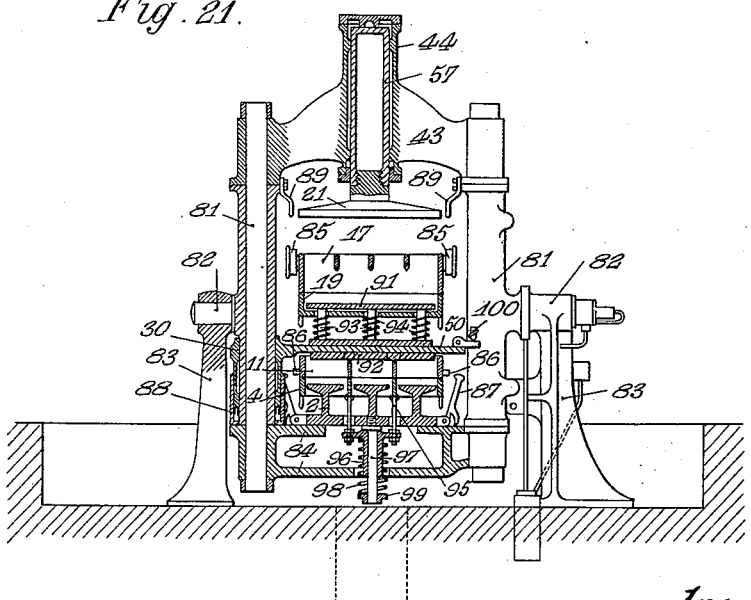

Of the drawings, Figs. 1 to 6 inclusive show the invention applied to one form of molding machine, Fig. 1 being a vertical section through the machine, parts whereof are broken away, Fig. 2 is a side elevation of the machine, and Figs. 3, 4, 5 and 6 are details thereof and Fig. 1ª is a view similar to that of Fig. 1 but shows the parts of the apparatus in different position; Figs. 7, 8, 9, 10, 11 and 12 show the invention applied to another type of machine, Fig. 7 showing the flasks in position to be filled with sand preparatory to ramming, Fig. 8 being a plan view of Fig. 7, Fig. 9 being a side elevation showing the flasks in position for ramming, Fig. 10 being a plan view of Fig. 9, Fig. 11 being a side elevation of the machine showing the flasks ready to be assembled after ramming operation, and Fig. 12 being a plan view of Fig. 11; Figs. 13, 14 and 15 illustrate my invention applied to another type of molding machine, Figs. 13 and 14 being sections through the machine, Figure 14 being a section taken on the line E—F of Fig. 13 and Fig. 15 being a section on the line a—a of Fig. 14; Figs. 16 and 17 illustrate still another application of my invention, the views being respectively a side elevation and plan of the machine; Figs. 18 and 19 illustrate another application of my invention, the figures being respectively a side elevation and a transverse section through the molding machine; and Figs. 20 and 21 show my invention applied to a molding machine of the roll-over type, the figures being respectively a side elevation and longitudinal section thereof. In the specification and drawings, wherever convenient, similar reference numerals indicate parts of the various machines having similar functions.

In order that my improved method of forming sand molds may be better understood, I shall describe the apparatus I employ, attention being first directed to Figs. 1 to 6, inclusive. The machine illustrated in these drawings is assumed to be mounted on the usual mold press, provided with a lateral column 26, on which the upper head of the machine which comprises a ramming piston, the lower portion only of which is shown, is adapted to rotate, a drawing piston being arranged below and in line with the ramming piston. These two pistons have not been shown in detail as they appear in the succeeding figures illustrating the other types of molding machines to which I have applied my improved apparatus.

Referring now to Fig. 1, it will be seen that I have mounted on the table 1 of the press, a plate 2 provided with parallel T-section ribs 3, arranged at intervals. The plate 2 is spaced away from the table 1 by means of a spacing frame 8. Above and around this plate 2 is a frame 4, normally held in the position indicated by the sleeves 6 and the springs 5 (see particularly, Fig. 3). Mounted on the upper ramming piston 20 is a ramming plate 21 provided with T-shaped ribs 22 similar in outline to those of the plate 2. The frame work 4 is adapted to support the flask members 11 and 17 when in position for ramming, the pattern plate 16 being interposed between the two flasks. On the upper flask 17 is mounted a sand retaining box 19, the purpose of which is to hold sufficient sand over the flask previous to ramming. The flasks are provided with the apertured lugs 12 and 18, into which are inserted dowel pins 13. The dowel pins 13 are retained in position by means of the sleeves 10 mounted on the frame 4. The plate 21 is provided at either end with rods 24 adjustably secured to lugs 23 and provided with hook portions at their lower ends, which hook portions engage slotted lugs 25 formed on the flask member 17. The sleeves 6 are provided with screw threaded portions at their lower ends, upon which are threaded the nuts 9, this arrangement affording a means whereby the level of the frame-work 4 may be varied to suit the requirements of the particular molding operation in hand. The lower piston 27 is provided with a plate 28 at the ends of which are adjustably mounted rods 29 which project slightly within the sleeves 6.

Rotatably mounted on the column 26 is a supporting bracket 30, the relative position of which is fixed by means of the adjustable collar 31. This bracket is composed of two projecting arms 32 provided with the hook portions 33 and 35, the hook portion 33 being fixed and the hooks 35 being mounted on the transverse rod 34. Mounted at the ends of the rod 34 are arms 41 which carry a counterbalance weight 42. Mounted on the rod 34 intermediate the arms 41 is an arm 37 which is provided with a cam 38, the arm 37 having its hub split and being provided with lugs 40 and with a screw 39, so that when it is in operative position, it can be locked relative to the arm 34.

The operation of this machine is as follows, assuming that the parts are in position indicated in Figs. 1 and 2. Water pressure is admitted into the upper cylinder, not shown, thereby lowering the piston 20 and plate 21, and ramming the upper flask. During this movement of the piston, the sand in the bottom frame 4 is also rammed by means of the plate 2, the pressure forcing down the frame 4 against the pressure of the springs 5. After the sand is rammed, the arms 24 are hooked into the lugs 25 and then the piston 20 is retracted. When the piston 20 is retracted, it carries the flask 17 with it and draws the upper mold from the pattern and the springs 5 then normally returning the frame work 4, the flask member 11 and the pattern plate 16 to normal position. The piston 20 is then swung out of the way about the column 26. Pressure is then admitted into the lower cylinder and raises the piston 27 and the rods 29, which rods pass through the sleeves 6 and take against the ends of the pattern plate and strip it from the lower mold. This operation is clearly illustrated in Fig. 1ª of the drawings which shows the piston 27 approaching its extreme upper position and the rods 29 abutting the pattern plate 16, so that on further upward movement of the piston 27, the pattern plate 16 will be elevated from the flask 11 and the pattern drawn. The bracket 30 is then swung about the column 26 until the hooks 33 and 35 engage the pattern plate, at which time the arm 37 is moved inwardly until the cam 38 locks the pattern plate in position on the hooks. The arm 37 is held in place by tightening the screw 39. The bracket 30 is then swung about the column 26 and carries with it the pattern plate 16. The upper piston 20 is then lowered until the flask members are brought together, when they are fastened in the usual manner and can be carried away for the casting operation. The machine is then ready for another operation.

It will be noted that the frame work 4 is provided with a number of ribs 14 which correspond to similar ribs 15 formed on the flask members 11 and 17, the object of these ribs being to strengthen and brace the flask members and the frame work 4. The slots 2ª between the sections of the ramming members are enlarged inwardly so that if any sand should enter, it will not obstruct the passage of the bars 14 and 15.

If desired, the pattern plate 16 may be first supported on the bracket 30 together with the flask member 17, and the lower flask member 11 may be placed in position on the frame work 4, whereby both flask members may be filled with sand simultaneously. In such case, the bracket 30 would be swung into position over the lower flask member and the piston 27 raised until the rods 29 support the pattern plate and upper flask. The bracket 30 is then swung about the column 26 out of the way, and the ramming piston 27 is lowered to normal position and pressure then admitted to the upper cylinder. From this point, the operation is substantially as above described.

Referring now to Figs. 7, 8, 9, 10, 11 and 12, it will be seen that I have there in illustrated a molding machine which is designed primarily to provide a convenient means for simultaneously filling the flask members with sand, simultaneously ramming the flask members and a convenient means for assembling the flask members while still in the machine. This machine is likewise provided with a table 1 on which is mounted the column 26. At the upper end of the column is rotatably mounted a strain bar or frame, 43, provided with a cylinder 44 in which is mounted the ramming piston 20, carrying the ramming plate 21. Instead of providing a bracket 30, I have provided a pattern plate supporting member 50 which is rotatably mounted on the column 26. This supporting member 50 is a fork of two arms of different lengths, said arms being provided with three points of support for the pattern plate, namely, a, b, and c, and with three pins, 51, which engage corresponding recesses in the pattern plate 16 for insuring the exact position of the latter. In order that the arms of the supporting member 50 may clear the machine when swung about the column 26, it will be noted that the column 26 is mounted in the table 1 at one side of the center line thereof and that the axis A—B of the column 26 and strain bar 43 when in locked position is at an angle to the normal axis C—D of the flask members and the table plate of the machine. The frame work 4 in this case is supported on the rods 61 which are mounted on the bar 47 carried by the rod 48 which is normally held in raised position by means of the spring 49. As in the case of the previous machine described, rods 29 are provided for drawing the pattern plate from the lower mold, said rods being actuated by means of a piston (not shown). The supporting member 50 is held in position on the column 26 by means of the collar 30. The operation of this machine is as follows, the parts being in the position illustrated in Fig. 7. The pattern plate 16 together with the upper flask member 17 with the sand retaining box 19 are supported on the member 50, and the lower flask member 11 is supported on the frame work 4, the supporting member 50 being swung about the column 26 clear of the balance of the machine. The flask members are then simultaneously filled with sand and the supporting member 50 is then swung into position over the lower flask member 11. Pressure is then admitted into the lower cylinder, raising the piston 27 and the rods 29, which rods take against the pattern plate 16 and raise and support it, together with the flask 17, which is full of sand. The support 50 is then swung to one side and the bottom piston 27 is allowed to descend again, the pattern plate 16 and flask 17 coming to rest on the lower flask 11. The strain bar 43 is then swung into position and the arm 46 thereof is locked into the slot 45 formed on the table 1 of the machine. Pressure is then admitted into the cylinder 44 and the piston 20 descends together with the ramming plate 21 and rams the sand in both flasks, the pressure exerted pressing down the flask 11 and frame 4 against the pressure of the spring 49, as was the case in the previous machine. After the sand is rammed in the flasks, the rods 24 are locked in the lugs 25 formed on the upper flask 17 and the piston 20 is then retracted, carrying with it the flask 17. The strain bar is then swung about the column 26 and pressure is admitted into the lower cylinder, which raises the piston 27 and the rods 29 which raise and strip the pattern plate 16 from the lower flask 11. At this time the support 50 is again swung into position beneath the pattern plate 16, and then the piston 27 is lowered. The pattern plate then rests on the support 50 and is swung out of the way. The strain bar 43 is again swung into position over the lower flask member and the piston 20 is lowered until the upper flask 17 rests on the lower flask, when they can be secured together and carried away after the rods 24 have been released from the lugs 25 and the strain bar 43 again swung out of position. The figures illustrate these various steps of the operation.

Reference will now be had to Figs. 13, 14 and 15, which figures illustrate a machine wherein the ramming is done from beneath upward. The ramming plates, flasks and pattern plate in this case are substantially similar to those already described save that in this machine, the upper ramming plate is supported from a strain bar 43 which is rotatably mounted on the supporting column 26 on an axis A—B at an angle to the normal axis C—D of the balance of the machine. The strain bar 43 is provided with a tubular rod 52 which is adapted to fit into a semi-cylindrical recess 53 formed in a boss 54 cast on the frame 55 of the machine. A nut 56 is threaded on the end of the rod 52. A lever 66 is pivoted to the strain bar 43 and carries a rod 67 which extends through the tube 52 and projects slightly from its lower end. When the lever 66 is moved downwardly, it carries with it the rod 67, the end of which passes through the recess 69 in a lug 68 cast on the framework 55 and engages a lever 70 for controlling the admission of pressure to the cylinder. By this construction, it is impossible to operate the machine unless all the parts are in absolutely correct position. In the cylinder 44 is mounted a hollow piston 57 provided at the top with a ramming plate 21 of the configuration already described. Secured to the head of the piston are depending rods 58 provided with nuts 59 which are adapted to bear against the top of the frame work 55 at the end of the stroke of the piston. The length of the stroke may be varied by changing the position of the nuts 59. Within the piston 57 is mounted a secondary piston 60 provided with an enlarged plate 62 fitting in the recess 63 formed in the head of the piston 57. This piston 60 is normally held in raised position by means of the spring 61. At either end of the plate 62 are mounted rods 64 which support the frame work 4. This arrangement affords a yielding support for the frame work 4 and the flask members such as has been already described. The pattern plate 16 is apertured at its ends and the flask members are provided with lugs, and dowel pins are provided to correctly position these parts the one upon another. In this machine I have also provided a supporting plate 50 of the same character as that of the preceding machine described, but of slightly different configuration. In order to adjust the elevation of the frame work 4 with respect to the ramming plate 21, I have provided screws 65 for the plate 62, which screws are adapted to take against the upper end of the piston 57 and will move the piston 60 downward against the pressure of the spring 61 to the desired point.

The machine operates as follows, assuming that the parts are in the position indicated in Fig. 14. The strain bar 43 is swung about the column 26 and the supporting member 50, carrying the pattern plate 16 and the upper flask member 17 is swung to one side, whereby it is possible to fill both flasks at the same time. The supporting member 50 is then swung into position so that the flask members will be in alinement and the cross bar 43 is then brought to operative position. The lever 66 is then lowered and operates the lever 70 for admitting pressure into the cylinder 44, the piston 57 then rises and the ramming of the two parts of the mold is effected simultaneously. During the ramming operation, the lower frame 4 yields under the pressure and compresses the spring 61. The upper flask 17 is secured to the strain bar 43 in the manner already described, the pressure is exhausted from the cylinder 44 and the flask 11 descends with the pattern plate 16, drawing the upper portion of the mold. During the descent of the piston 57, the corresponding movement of the pattern plate 16 is finally arrested by the supporting member 50. The lower box 11 continues to descend with the piston 57 and the lower portion of the mold is drawn. The pattern plate 16 is then swung out of position about the supporting column 26, pressure is admitted into the cylinder 44 and the piston 57 raises the flask 11 against the upper flask, when they can be secured together and removed. When the pressure is exhausted from the cylinder 44 after the ramming operation, the spring 61 will return the frame work 4 to normal position free of the ramming plate 21. My invention is very effective when applied to a machine wherein the ramming pressure is exerted in an upward direction for the reason that the stripping of both the upper and the lower halves of the mold is facilitated by the action of gravity on the moving parts.

For molding articles of large dimensions, the arrangement of a rotating support for carrying the pattern plate to the upper flask member might not be as practical and manipulation not as convenient. In such cases it is preferable to substitute for the said rotary pattern plate support, a carriage movably mounted on the frame work of the machine. Such an arrangement is shown in Figs. 16 and 17 as applied to a machine having downward compression. This machine is for the main part substantially the same as those already described, and has substantially the same operation with the exception of the means for supporting the pattern plate 16 and the upper flask member 17. The table of the machine extends to one side and is provided with tracks 71 upon which is mounted a frame work or car 73 mounted on wheels 72. The car is a three-sided frame work, e, d, and f, and the distance between the edges of the side members e and d, is slightly greater than the width of the pattern plate 16 and the flask 17. The pattern plate in this case is provided with projecting lugs 75 and the sides, e and d, of the car are provided with recesses 74 through which said lugs will pass, the lugs 75, however, supporting the pattern and flask on the car when not in alinement with the said recesses.

The operation of the machine after the flasks have been filled is as follows. The car is moved until the pattern plate is in position over the lower flask member 11, at which time pressure is admitted into the cylinder to raise the piston which carries the rods 29. These rods take against the pattern plate and raise it from the car, which can then be retracted. The piston is then lowered and the pattern plate and upper flask member are supported on the lower flask member. Pressure is then admitted into the upper cylinder and the ramming operation is performed. The operation of the machine is then the same as that already described.

In Figs. 18 and 19 I have shown a machine very similar to the one shown in Figs. 16 and 17, the ramming, however, being from beneath upward. This machine is likewise designed for heavy work and is placed in a pit 77 so that the tracks 71 which support the car 73 may be on a level with the ground, the said tracks extending on either side of the machine. The car is provided with wheels 72 and the lower flask provided with wheels 76. The car is composed of the same framework and supports the pattern plate in the same manner as the preceding machine, but the tracks 71 are composed of I-girders which form a runway for both the flask and the carriage. The cylinder 44 has mounted therein the hollow piston 57, which in turn carries the supplementary piston 60 normally held in raised position by means of the spring 61. In addition, the cylinder 44 has another cylinder 79 secured to the bottom portion thereof, in which cylinder is mounted the piston 78, the end of which takes against the piston 57. The strain bar 43 is provided with a ramming plate 80 and has arms which lock into position in lugs in the upper flask member as heretofore described. The flasks and pattern plates are heavy in construction and are placed together and rolled onto the machine. Pressure is then admitted to the cylinder 79 which raises the piston 78 and the piston 57 and lifts the flasks so that the upper flask can be secured to the ramming plate 80. The lower flask is then brought back and supported on its frame 4, after which the car carrying the pattern plate is rolled onto the machine. Pressure is again admitted to the cylinder 79 to elevate the lower flask against the upper flask which is then released from engagement with the plate 80 and is brought to rest on the pattern plate on the carriage. The carriage is then retracted and the filling of both flasks can be proceeded with, after which the carriage is rolled back onto the machine and the flasks are rammed. From this point on the machine operates as those already described. It will be obvious that this arrangement is very convenient for handling large apparatus in an economical way, inasmuch as the piston 78 is very small and but little pressure is required for the initial operations previous to ramming.

In Figs. 20 and 21, I have shown my invention applied to a molding machine of the roll-over type, which machine comprises the columns 81, provided with trunnions 82, supported in bearing brackets 83. The upper ends of the columns 81 are connected together by means of the strain bar 43, which strain bar is provided with the cylinder 44 in which is mounted the ramming piston 57. The ramming piston is provided with a ramming plate 21. The lower ends of the columns 81 are connected together by means of the table plate 84, which table plate is adapted to rotate about one of the columns and is secured to the other column by suitable locking means. This machine is provided with the same sand box 19 and frame work 4 as the machines previously described, but in this case the frame work 4 is supported by the rods 95, the bar or plate 96 and the spring 98. The sand box 19 is supported from the supporting member 50 by means of the sleeves 93 and springs 94, the sleeves 93 projecting through the bottom portion of the box and bearing against the upper pattern plate 91. The lower pattern plate 92 is secured to the under side of the support 50. In order to position the supporting member 50 (which, as in the other instances, rotates about the column 81), I have provided a locking mechanism 100 secured to the other column. As the flask members are of considerable weight and are difficult to manipulate by hand, I have provided the flask 17 with wheels 85 adapted to engage tracks 89 mounted on the columns 81. When the machine is inverted, these tracks are on a level with the tracks 90 leading to the machine. In order to support the flask 11 when the machine is inverted, I have provided the hooks 87 secured to the ramming plate 2 mounted on the table 84 which hooks engage lugs 86 formed on the flask 11. During the ramming operation, the box 19 and frame work 4 yield as previously described, but in this instance, the plate 96 which supports the frame work 4 has sliding engagement with the guide rod 97, at the end of which is threaded the nut 99 for adjusting the tension of the spring 98.

The operation of this machine is as follows. The flask members are placed together and rolled on the track 90 adjacent the machine, which is then inverted until the tracks 89 are level with the tracks 90, at which time the flasks are rolled onto the machine. Pressure is then admitted into the cylinder 44, which raises the piston 57 and elevates the flask members until the flask 11 can be secured to the table plate 84 by means of the hooks 87, it being understood, of course, that the supporting member 50 and the pattern plates (it is preferable with this construction to use a double pattern plate) are swung out of the way. The piston 57 is then allowed to descend and the supporting member is swung into position. Pressure is again admitted to the cylinder 44 until the flask 17 and sand box 19 bear against the supporting member 50, at which time the machine is inverted and assumes the position indicated in Fig. 21. The supporting member 50, which now carries the flask 17, is swung out of the way and both flask members are filled with sand. The lower flask member, if desired, may be swung about the column 81 on the table plate 84 for convenience in filling. The parts are then brought into alinement again and are rammed. The drawing of the patterns and the assembling of the flasks is then substantially as already described. It is to be noted that the supporting member 50 in this instance is provided with a collar 30 mounted in the cylinder 88, supported by the table plate 84. This arrangement permits the necessary movement of the supporting plate occasioned by the yielding mountings of the box 19 and the frame work 4.

It will be seen that in all instances, previous to ramming, the flasks are supported on what might be termed the interrupted ramming plates which support the sand in the flasks. By this arrangement, the two flasks can be rammed simultaneously and herein resides my improved method of forming the halves of sand molds. It is thought that this improved method will be clear without further description.

The chief advantages of my construction are that it saves labor and time and increases the efficiency of the machine and thereby increases production of single machines. The machines themselves are simple in construction, are easy to manipulate and are effective in operation. The flask members and frame work 4 are very durable because of the peculiar construction of transverse supporting or bracing bars. By my improved apparatus, the molding operation is greatly simplified and facilitated because it is possible to fill the flasks simultaneously, ram them simultaneously, draw the patterns and assemble the flasks for casting, all on the same machine. Other advantages incidental to the invention will occur to those familiar with the art.

It will be, of course, understood that during the drawing of the patterns, the apparatus may be agitated or "rapped" in any preferred manner, and it will also be understood that the various minor parts which do not appear in all figures specifically, are included in the various types of machines.

Having thus described my invention and illustrated its use, what I claim as new and desire to secure by Letters Patent is the following:

1. In a molding machine, the combination with a frame work and a pair of mold flasks provided with an interposed pattern plate, of a pair of opposing ramming members mounted on the frame work and having relative movement with respect to each other, a supporting member for the lower flask, a pattern plate support rotatably mounted on the frame work between the two ramming members for supporting the pattern plate adapted to be swung into and out of alinement with the flasks and means for elevating the pattern plate out of engagement with the pattern plate support when the latter is in alinement with the flasks, whereby the drawing of the pattern is effected.

2. In a molding machine, the combination with a frame work and a pair of mold flasks provided with an interposed pattern plate, of a pair of ramming members mounted on the frame work having relative movement with respect to each other, a supporting member for the lower flask, a pattern plate support for supporting the pattern plate mounted on the frame work and adapted to be moved into and out of alinement with the flasks and means for elevating the pattern plate out of engagement with the said pattern plate support when the latter is in alinement with the flasks, whereby the drawing of the pattern is effected.

3. In a molding machine, the combination with a frame work and a pair of mold flasks provided with an interposed pattern plate, of a pair of ramming members mounted on the frame work and having relative movement with respect to each other, a supporting member for the lower flask, a pattern plate support for supporting the pattern plate mounted on the frame work and adapted to be moved into and out of alinement with the flasks, a piston, and a plurality of arms mounted on the piston adapted to pass the pattern plate support and elevate the pattern plate therefrom, and means for operating the piston.

4. In a molding machine, the combination with a frame work and a pair of mold flasks provided with an interposed pattern plate, of a stationary ramming member, a movable ramming member, a support for the lower flask, means for drawing the pattern plate from the lower mold, and a movable bracket mounted on the frame work adapted to support the pattern plate in or out of alinement with the mold flasks, so arranged that when the bracket is in alinement, the pattern plate may be raised therefrom by its said drawing means.

5. In a molding machine, the combination with a frame work and a pair of mold flasks provided with an interposed pattern plate, of a pair of ramming members mounted on the frame work having relative movement with respect to each other, a frame for supporting the lower flask over the lower ramming member, means for securing the upper flask to the upper ramming member, a pattern plate support movably mounted on the framework between the ramming members for supporting the pattern plates adapted to be moved into and out of alinement with the flasks, and means for elevating the pattern plate free of the pattern plate support when the latter is in alinement with the flasks, said means being adapted to raise the lower mold flask into engagement with the upper flask when the pattern plate support is moved out of alinement with the machine.

6. A molding machine for simultaneously ramming the halves of a sand mold comprising in combination an upper movable ramming member, a lower ramming member, a pair of flasks located between the ramming members and provided with an interposed pattern plate, means for fastening the upper flask to the upper ramming member whereby to effect the drawing of the upper flask when the upper ramming member is retracted, and movable means for elevating the pattern plate with respect to the lower flask whereby the pattern is drawn from the lower flask.

7. In a molding machine, the combination of a pair of mold flasks provided with an interposed pattern plate, a pair of opposing ramming members having relative movement with respect to each other, a supporting member for the lower flask, a pattern plate support mounted for rotative movement between the ramming members for supporting the pattern plate and adapted to be swung into and out of alinement with the flasks, and means for elevating the pattern plate out of engagement with the pattern plate support when the latter is in alinement with the flasks, whereby the drawing of the pattern is effected.

8. In a molding machine, the combination of a pair of mold flasks provided with an interposed pattern plate, a pair of opposing ramming members having relative movement with respect to each other, a supporting member for the lower flask, a pattern plate support movably mounted for movement between the ramming members into and out of alinement with the flasks, and means for elevating the pattern plate out of engagement with the pattern plate support when the latter is in alinement with the flasks, whereby the drawing of the pattern is effected.

In testimony whereof I have hereunto signed my name in the presence of the two subscribed witnesses.

EUGENE RONCERAY.

Witnesses:
GEORGES ROMANET,
H. C. COXE.

Copies of this patent may be obtained for five cents each, by addressing the "Commissioner of Patents, Washington, D. C."